(12) United States Patent
Pettey et al.

(10) Patent No.: US 8,032,684 B2
(45) Date of Patent: Oct. 4, 2011

(54) PROGRAMMABLE BRIDGE HEADER STRUCTURES

(75) Inventors: Christopher J. Pettey, Leander, TX (US); Stephen Glaser, San Francisco, CA (US)

(73) Assignee: Emulex Design and Manufacturing Corporation, Costa Mesa, CA (US)

( * ) Notice: Subject to any disclaimer, the term of this patent is extended or adjusted under 35 U.S.C. 154(b) by 0 days.

(21) Appl. No.: 12/885,770

(22) Filed: Sep. 20, 2010

(65) Prior Publication Data

US 2011/0131359 A1 Jun. 2, 2011

Related U.S. Application Data

(63) Continuation of application No. 11/680,008, filed on Feb. 28, 2007, now Pat. No. 7,865,654.

(60) Provisional application No. 60/777,625, filed on Feb. 28, 2006.

(51) Int. Cl.
*G06F 13/36* (2006.01)

(52) U.S. Cl. ........ 710/311; 710/306; 710/312; 710/316; 370/351; 370/389; 370/408; 370/409

(58) Field of Classification Search .................. 710/302, 710/305, 306, 311, 312, 313, 315, 316; 370/351, 370/389, 408, 409, 465
See application file for complete search history.

(56) References Cited

U.S. PATENT DOCUMENTS

| 5,841,988 | A | 11/1998 | Chennubhotla et al. |
| 7,054,979 | B2 | 5/2006 | Streitenberger et al. |
| 7,073,010 | B2 * | 7/2006 | Chen et al. .................... 710/313 |
| 7,080,164 | B2 | 7/2006 | Jacobs et al. |
| 7,293,129 | B2 * | 11/2007 | Johnsen et al. ............... 710/313 |
| 7,356,636 | B2 | 4/2008 | Torudbakken et al. |
| 7,366,872 | B2 | 4/2008 | Lake et al. |
| 7,415,551 | B2 | 8/2008 | Pescatore |
| 7,457,897 | B1 | 11/2008 | Lee et al. |
| 7,752,346 | B2 * | 7/2010 | Talayco et al. .................... 710/9 |
| 7,925,817 | B2 * | 4/2011 | Uehara et al. ................. 710/316 |
| 2006/0242354 | A1 * | 10/2006 | Johnsen et al. ............... 710/316 |
| 2007/0263642 | A1 | 11/2007 | Harriman |
| 2008/0040526 | A1 | 2/2008 | Suzuki et al. |
| 2009/0204716 | A1 * | 8/2009 | Srinivasan et al. ............ 709/230 |

OTHER PUBLICATIONS

Budruk et al. PCI Express System Architecture. Mindshare, Inc. Apr. 2008.*
PCI Special Interest Group. "PCI Local Bus Specification". Revision 2.1. Jun. 1, 1995. pp. 1-298.
PCI SIG. "Errata for the PCI Express Base Specification." Revision 1.1. Feb. 2007. pp. 1-41.
Regula, Jack. "Using Non-transparent Bridging in PCI Express Systems". Jun. 1, 2004. pp. 1-31.
Hudson, Chuck et al. "Motivation & Approaches for Edge Virtual Bridging or NIC Aggregation". pp. 1-11. Jan. 2009.

* cited by examiner

*Primary Examiner* — Matthew Spittle
(74) *Attorney, Agent, or Firm* — James W. Huffman

(57) ABSTRACT

A computer system includes compute nodes coupled through a switch to shared or non-shared I/O devices. The switch includes a pool of bridge headers and virtual bridges coupling a root port of a compute node to each of one or more shared or non-shared I/O devices. The switch is configured to associate each of the virtual bridges with a respective one of the fixed pool of bridge headers, receive a packet including data identifying the root port and a shared or non-shared I/O device, and route the packet in response to comparing data in the packet to data in the bridge headers associated with the virtual bridges. The virtual bridges comprise a hierarchy of virtual bridges in which one virtual bridge connects the root port to the remaining virtual bridges of the hierarchy. The switch may change the associations between virtual bridges and bridge headers.

15 Claims, 8 Drawing Sheets

PROGRAMMABLE BRIDGE HEADER STRUCTURES

CROSS-REFERENCE TO RELATED APPLICATIONS

This application is a continuation of co-pending U.S. patent application Ser. No. 11/680,008, entitled PROGRAMMABLE BRIDGE HEADER STRUCTURES, filed on Feb. 28, 2007, having a common assignee and common inventors, and which claims the benefit of U.S. Provisional Application Ser. No. 60/777,625 filed on Feb. 28, 2006.

BACKGROUND OF THE INVENTION

1. Field of the Invention

This invention relates generally to the field of computer system architecture and more particularly, to an architecture that allows mapping between computing nodes and shared or non-shared I/O devices.

2. Description of the Related Art

Computing systems often contain multiple compute nodes. For example, computing systems may include multiple CPUs, one or more multi-core CPUs, CPUs that operate in multiple operating system domains, and/or multiple single-board computers configured as blades and mounted in a common chassis or drawer. In addition, computer nodes may be interfaced to multiple I/O devices. I/O devices may be any devices that allows data to be transferred or from to the compute nodes. For example, compute nodes may be coupled to one or more network interfaces such as Ethernet, storage area network interfaces such as Fibre Channel, graphics cards, USB or Firewire controllers, etc. In addition, redundant connections may also be desired to improve availability and reliability of the I/O interfaces. In modern computer systems, an interface subsystem placed between the computer nodes and the I/O devices may include a variety of chipsets connecting a host bus on the compute node side to one or more I/O buses on the other side, such as ISA, EISA, PCI, PCI-X, compact PCI, AGP, etc.

In order to make more effective use of the I/O devices in a system, the interface subsystem may be designed to permit compute nodes to share I/O devices. For instance, in a computer system that uses multiple blades to increase the available processing power, instead of placing I/O interface chipsets and I/O devices on each blade, each blade may interface to a set of shared I/O cards through a midplane that includes hardware to replace the function of the interface chipsets. The resulting architecture may provide a lower overall system cost, higher configuration flexibility, and more complete utilization of I/O devices. One skilled in the art will appreciate that a system of blades coupled to I/O devices through a midplane is but one example of an architecture in which I/O interface chipsets are separate from the compute nodes. What should be appreciated is that regardless of the type of compute nodes and I/O devices provided, some type of I/O interface permits the I/O devices to be shared. Further, the I/O interface may allow compute nodes to be designed, manufactured and sold separately from the I/O devices. Still further, the I/O interface may provide switching between compute nodes and I/O devices. Still further, the I/O interface may allow multiple compute nodes, operating independently and having one or more operating system domains, to share I/O devices as if the devices were dedicated to them.

In addition to the foregoing design considerations, efficient I/O interfaces are typically implemented in hardware or a combination of hardware and software. In the following descriptions, such I/O interfaces may be described as virtualization hardware, although it is understood that some functions of the I/O interface may comprise software and/or hardware. Virtualization hardware may typically include one or more switches to interconnect the compute nodes with the I/O devices. These switches combine together to create a virtual view of a switch fabric for each compute node. That virtual view may or may not correspond to the physical fabric layout.

One implementation of virtualization hardware uses the PCI Express protocol to interconnect compute nodes and I/O devices. In this implementation, the virtualization hardware presents a virtual view of a PCI Express system to each compute node. This virtual view contains virtual PCI Express switches for some or all of the physical PCI Express switches in the fabric. The virtual view also contains virtual I/O devices for some or all of the I/O devices in the fabric.

In a PCI Express system, a PCI switch consists of a set of virtual PCI to PCI bridges. There is one PCI to PCI bridge for each port on the PCI Express switch, either input or output. Virtual PCI express switches created by virtualization hardware also consist of PCI to PCI bridges for each port. For example, in a system with four compute nodes, each having a virtual PCI Express switch with five ports, the virtualization hardware would have to implement twenty PCI to PCI bridges. In conventional PCI Express switches, each PCI to PCI bridge is assigned a hardware data structure commonly referred to as a PCI bridge header. One way to implement a virtual PCI express switch is to assign a PCI bridge header to each port of each virtual switch. In the example of four virtual switches having five ports each, sufficient hardware for twenty bridge headers would be needed. For small numbers of virtual switches, this may be an acceptable solution. However, when larger numbers of virtual switches are created, many resources for the PCI bridge headers are required. Since the PCI Express specification defines more than 500 addressable bits in each header structure, the cost of header hardware may place a practical limit on the capabilities of virtualization hardware. In addition, if the PCI bridges are fixed for each switch port, only a single configuration is enabled. Accordingly, what is needed is a mechanism to enable bridge headers to be assigned more efficiently and in multiple configurations.

SUMMARY OF THE INVENTION

Various embodiments of a computer system are disclosed. In one embodiment, a computer system includes at least one compute node coupled through a switch to a plurality of shared I/O devices. The switch includes a fixed pool of bridge headers and a first plurality of virtual bridges coupling a first root port of a first compute node to each of at least a first subset of the plurality of shared I/O devices. The switch is configured to associate each of the first plurality of virtual bridges with a respective one of the fixed pool of bridge headers, receive a first packet including data identifying the first root port and a first shared I/O device of the at least a first subset of the plurality of shared I/O devices, and route the first packet in response to comparing first data in the first packet to data in one or more of the bridge headers associated with the first plurality of virtual bridges.

In one embodiment, the first plurality of virtual bridges comprises a hierarchy of virtual bridges in which a first virtual bridge connects the first root port to the remaining virtual bridges of the hierarchy. In a further embodiment, the switch is configured to change at least one of the associations between the first plurality of virtual bridges and the fixed pool of bridge headers.

In a still further embodiment, the switch includes a second plurality of virtual bridges coupling a second root port of a second compute node to each of at least a second subset of the plurality of shared I/O devices. The switch is configured to associate each of the second plurality of virtual bridges with a respective one of the fixed pool of bridge headers, receive a second packet including data identifying the second root port and a second shared I/O device of the at least a second subset of the plurality of shared I/O devices, and route the second packet in response to comparing second data in the second packet with data in one or more of the bridge headers associated with the second plurality of virtual bridges.

In a still further embodiment, the first subset of the plurality of shared I/O devices includes at least one device that is also included in the second subset of the plurality of shared I/O devices. In a still further embodiment, the first root port is coupled to a third subset of the plurality of shared I/O devices and the number of virtual bridges in the first plurality of virtual bridges is less than the number of shared I/O devices in the third subset.

Figure 1:
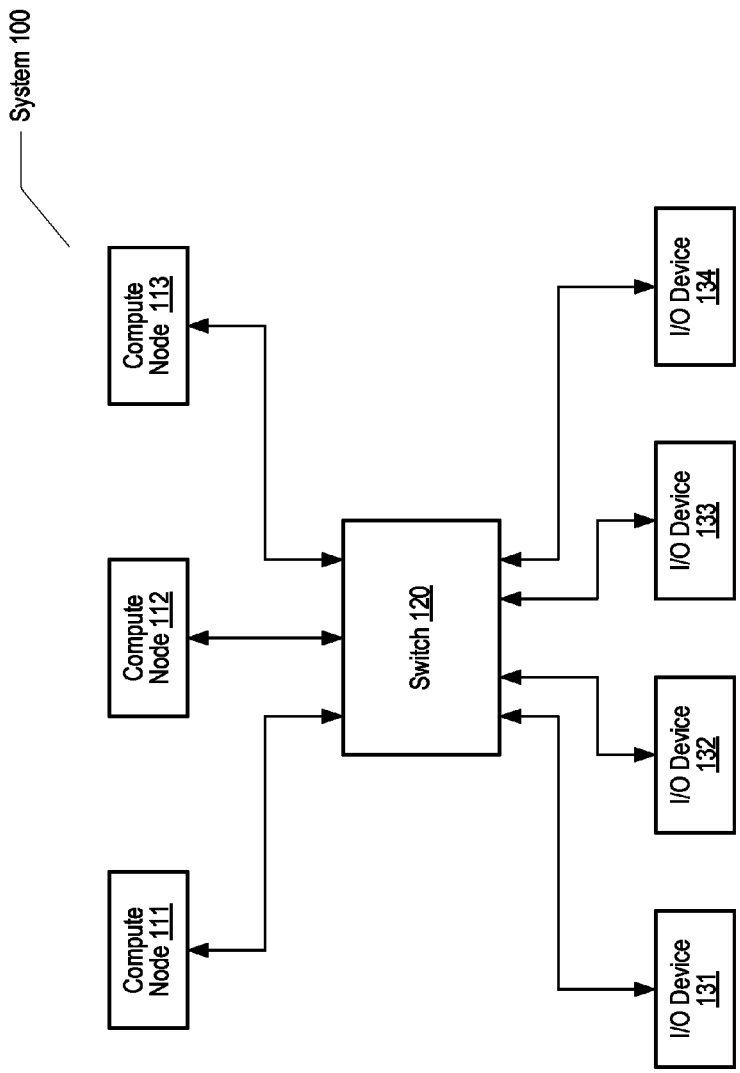
FIG. 1 illustrates a generalized block diagram of one embodiment of a computer system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 illustrates a generalized block diagram of one embodiment of a computer system 100. Computer system 100, as shown, includes compute nodes 111, 112, and 113 coupled to I/O devices 131, 132, 133, and 134 through a switch 120. Each compute node may be a CPU, one or more multi-core CPUs, a CPU that operates in multiple operating system domains, and/or a single-board computer configured as a blade and mounted in a common chassis or drawer with other blades. A single connection is shown between each compute node and switch 120, although in alternative embodiments, a compute node may include more than one point of connection, commonly referred to as a root port. Multiple root ports on a single compute node may be referred to as a root complex. A root complex is typically a chip set that provides the interface between processing elements and memory and downstream I/O. Each root port of a root complex may have its own switch connection.

I/O devices 131-134 may be shared by compute nodes 111-113 through switch 120. Switch 120 may be virtualization hardware or hardware and software. For example, switch 120 may include a fabric of one or more PCI Express switches. Switch 120 may also include storage hardware for implementing PCI Express bridge headers.

Figure 2:
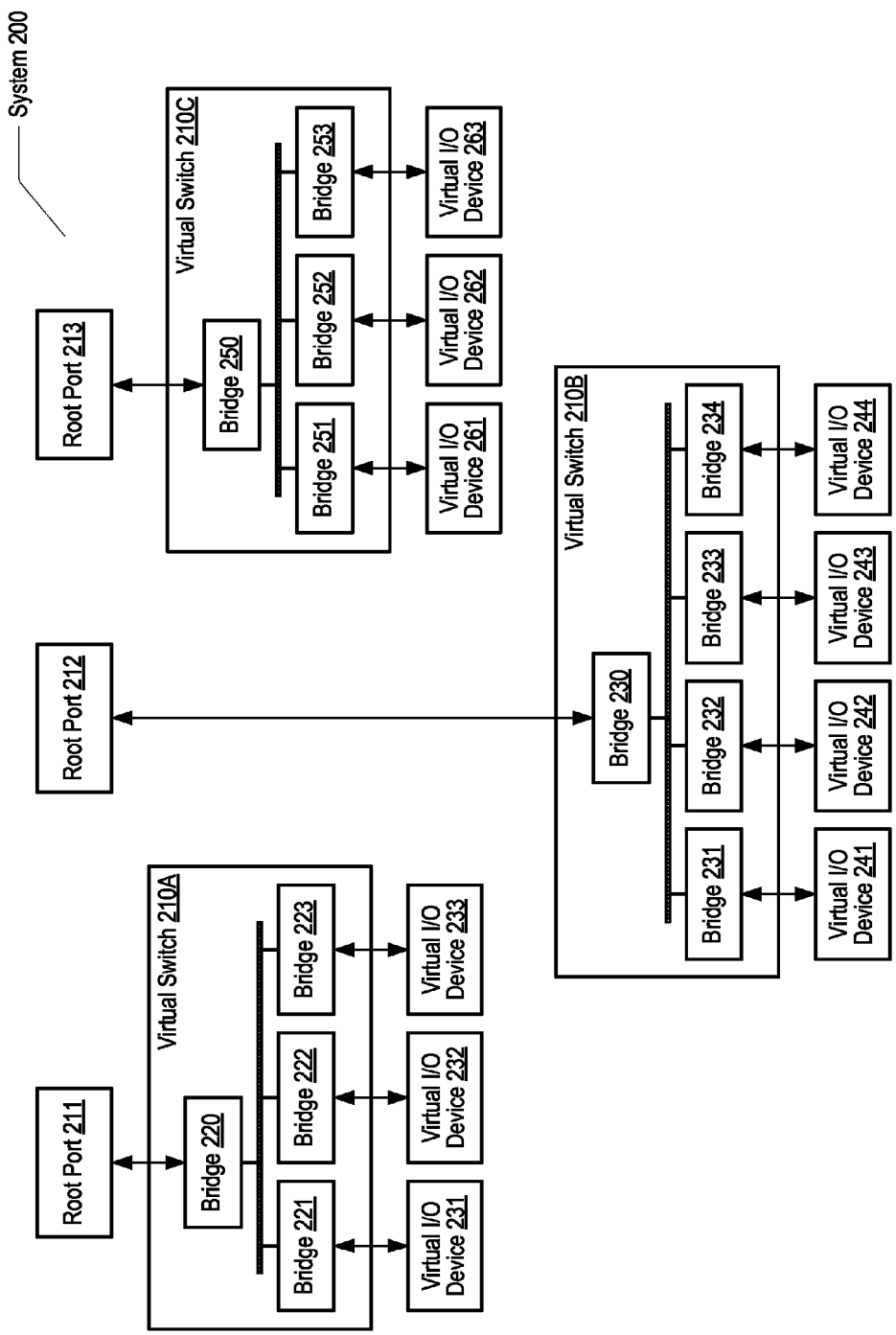
FIG. 2 illustrates one embodiment of a computer system.

FIG. 2 illustrates one embodiment of a computer system 200. Computer system 200, as shown, includes root ports 211-213 coupled to a set of I/O devices through a set of virtual switches 210A-210C. In one embodiment, root ports 211-213 may correspond to compute nodes 111-113 of FIG. 1 and virtual switches 210A-210C may be implemented by switch 120 of FIG. 1. Virtual switch 210A may present a set of virtual I/O devices 231-233 to root port 211 through virtual bridges 220-223. Virtual I/O devices 231-233 correspond to one or more of physical devices 131-134 of FIG. 1. The correspondence between virtual I/O devices 231-233 and physical devices 131-134 is determined by the configuration of virtual switch 210A according to a process that will be described further below. Virtual switch 210B may similarly present a set of virtual I/O devices 241-244 to root port 212 through virtual bridges 230-234. Virtual switch 210C may similarly present a set of virtual I/O devices 261-263 to root port 213 through virtual bridges 250-253.

Each of virtual switches 210A, 210B, and 210C is shown to include a two-level virtual hierarchy of bridges. For example, virtual switch 210A include bridge 220 for receiving downstream inputs from and conveying upstream outputs to root port 211. Bridge 220 is connected via a bus to bridges 221-223, one for each downstream output/upstream input port. In one embodiment, bridges 220-223 may comply with the PCI express specification. In alternative embodiments, virtual switches 210 may include a physical hierarchy of more than two levels. In particular, virtual switches 210 may take advantage of PCI type 1 (transparent) mode bridges to provide access to virtual I/O devices through a physical hierarchy of two or more levels that is modeled as a two-level virtual hierarchy as shown.

Figure 3:
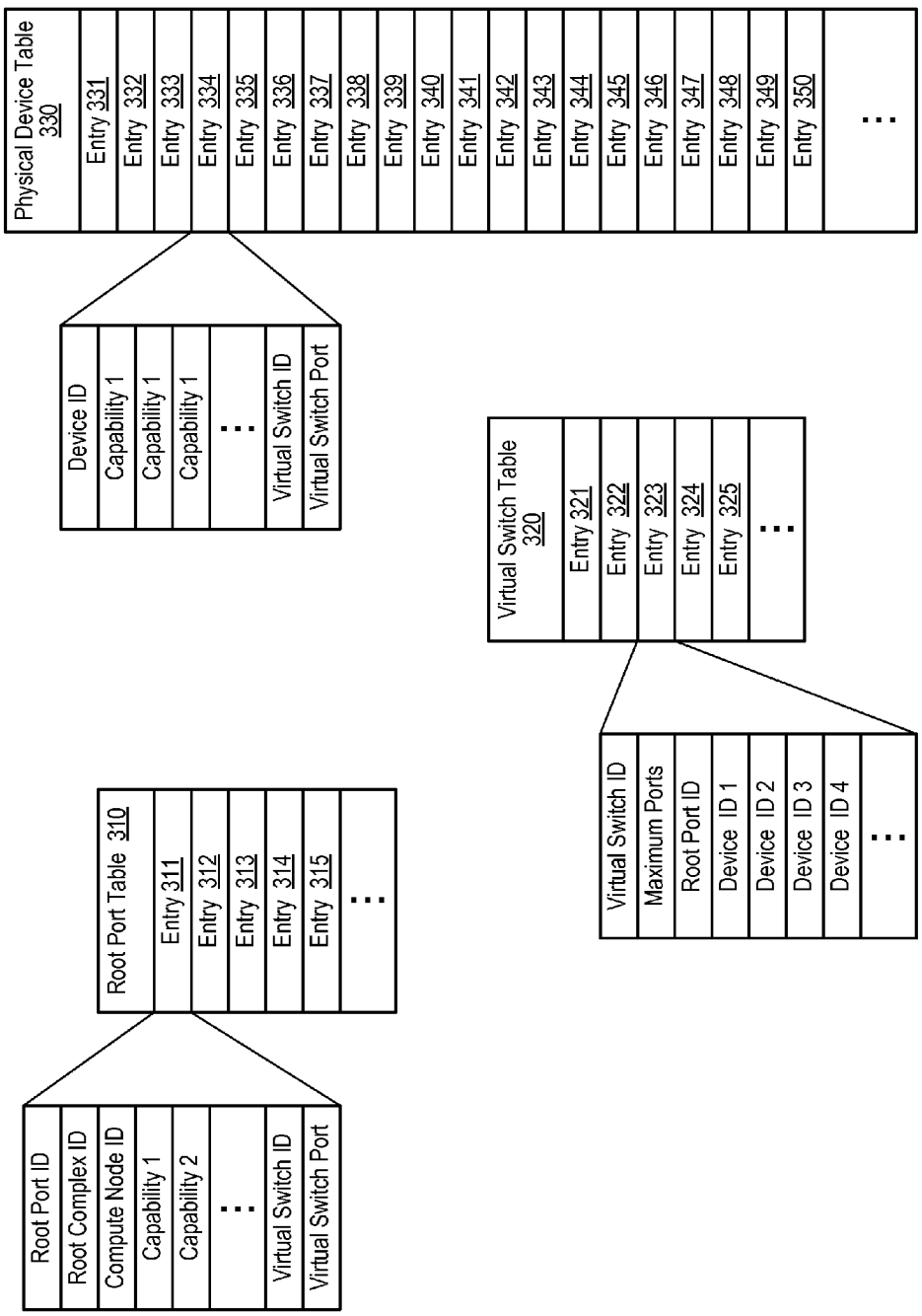
FIG. 3 illustrates one embodiment of a set of tables used in the configuration of virtualization hardware.

FIG. 3 illustrates one embodiment of a set of tables 310, 320, and 330 used in the configuration of virtualization hardware. Root port table 310, as illustrated, includes entries 311-315, etc., each corresponding to one root port in a computer system. In one embodiment, each root port table entry includes a root port ID, a root port complex ID, and a compute node ID for identifying the root port. Each root port table entry may further include one or more capability fields that indicate characteristics of the root port such as software visibility, version number, etc. Also, each root port table entry may include a virtual switch ID and a virtual switch port number that indicate the virtual switch and port that are configured to exchange data with the root port.

Physical device table 330, as illustrated, includes entries 331-350, etc., each corresponding to one physical I/O device in a computer system. In one embodiment, each physical device table entry may include a device ID to distinguish one device from another in the table. In addition, each entry may include one or more capability fields that indicate characteristics of the I/O device such as maximum number of shared instances, version number, etc. Also, each physical device table entry may include a virtual switch ID and a virtual switch port number that indicate the virtual switch and port that are configured to exchange data with the physical device.

Virtual switch table 320, as illustrated, includes entries 321-325, etc., each entry corresponding to one virtual switch such as virtual switches 210A, 210B, and 210C as illustrated in FIG. 2. In one embodiment, each virtual switch table entry may include a virtual switch ID to distinguish one virtual switch from another. In addition, each entry may include a field whose value indicates the maximum number of ports that may be configured in the virtual switch. Also, a field may be included that identifies a root port that is associated with the virtual switch and one or more fields that identify physical devices that are associated with the virtual switch. In one embodiment, there may be a one-to-one correspondence between virtual switches and root ports, i.e., virtualization hardware may create a separate virtual switch for each root port in the system.

During configuration of virtualization hardware, a system administrator may examine the data found in root port table 310 and physical device table 330 to determine what virtual switches are desired. Subsequently, the system administrator may configure the desired virtual switches by populating the fields of virtual switch table 320. In one embodiment, virtualization hardware may be configured to populate root port table 310 and physical device table 330 with the results of a discovery process driven by software as may be used conventionally to find PCI-interconnected devices. Once the root ports and physical devices have been enumerated in their respective tables, a system administrator may create a virtual switch table entry for each root port. The system administrator may then fill in the desired fields of the virtual switch table entry to configure the corresponding virtual switch to be able to access the desired physical devices. In one embodiment, virtualization hardware may include software to fill in fields in root port table 310 and physical device table 330 with data corresponding to the data entered in virtual switch table entries by the system administrator.

Figure 4:
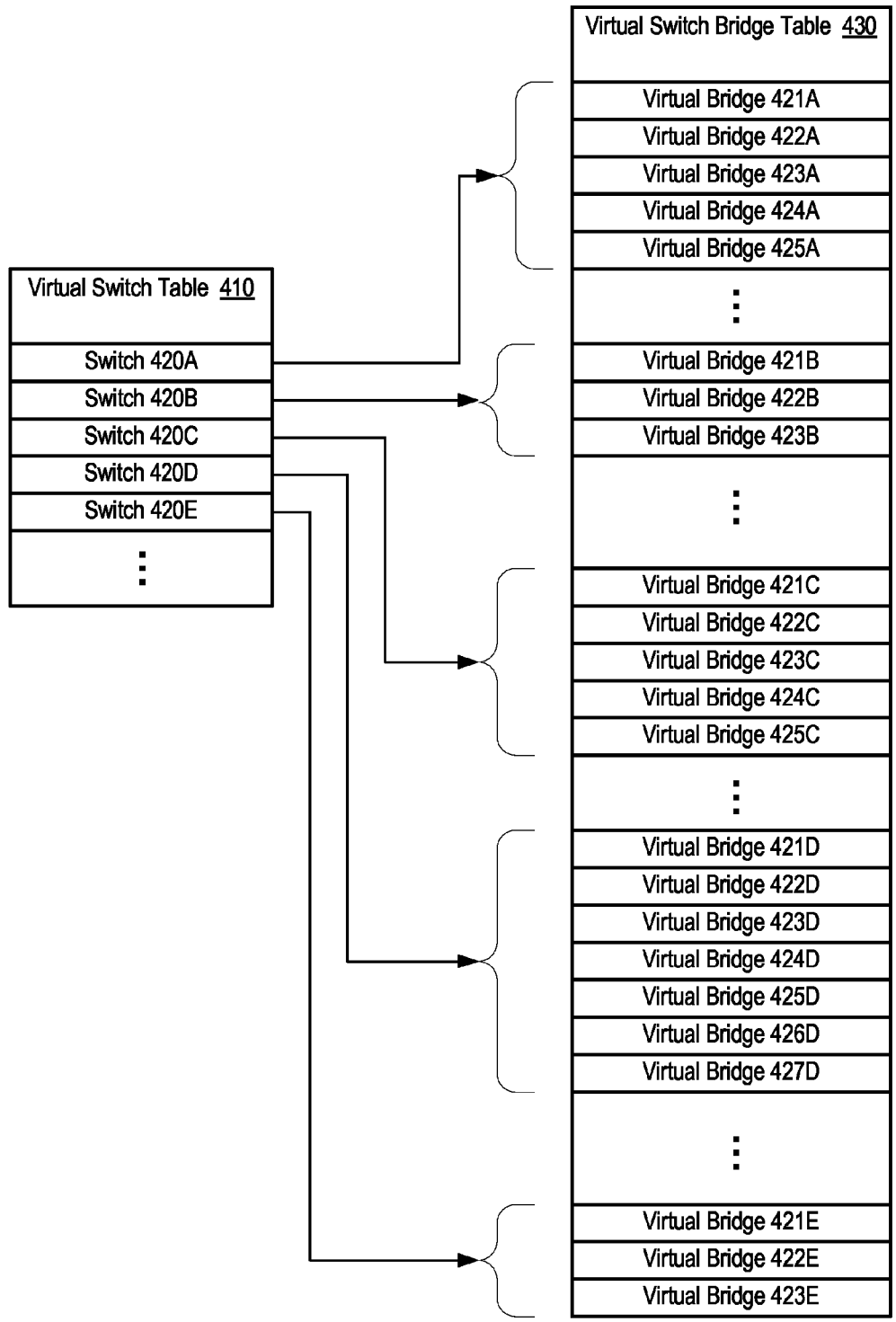
FIG. 4 illustrates one embodiment of a set of virtual switch configuration tables.

FIG. 4 illustrates one embodiment of a set of virtual switch configuration tables. Virtual switch table 410 includes an entry for each of virtual switches 420A-420E. Virtual switch bridge table 430 may include an entry for each virtual switch bridge that is configured in virtualization hardware. In one embodiment, entries in virtual switch table 410 may contain information similar to that included in entries in switch table 320 as described above. Further, entries in virtual switch table 410 may point to a region of virtual switch bridge table 430 containing entries for each bridge that is configured in the corresponding virtual switch. For instance, the virtual switch table entry for switch 420A may point to a region of virtual switch bridge table 430 that includes entries for virtual bridges 421A-425A. In one embodiment, the entry in table 410 for switch 420A may point to the entry in table 430 for virtual bridge 421A. Additional virtual bridges 422A-425A may be located in table 430 at a known offset from the entry for virtual bridge 421A, or by some other appropriate linking mechanism. Virtual bridge 421A may be the virtual bridge that is coupled to a root port while additional virtual bridges 422A-425A may be coupled to physical devices. Similarly, the virtual switch table entry for switch 420B may point to a region of virtual switch bridge table 430 that includes entries for virtual bridges 421B-423B, etc. It is noted that each virtual switch may be configured to have a different number of operating virtual bridges, depending on the desired connectivity of the corresponding root port, the number of available physical devices, the number of times each physical device may be shared, and the resources available in virtualization hardware. As shown in FIG. 4, table 430 may be sparsely populated, indicating that there are more resources available to support the configuration of additional virtual bridges than are currently allocated.

Figure 5:
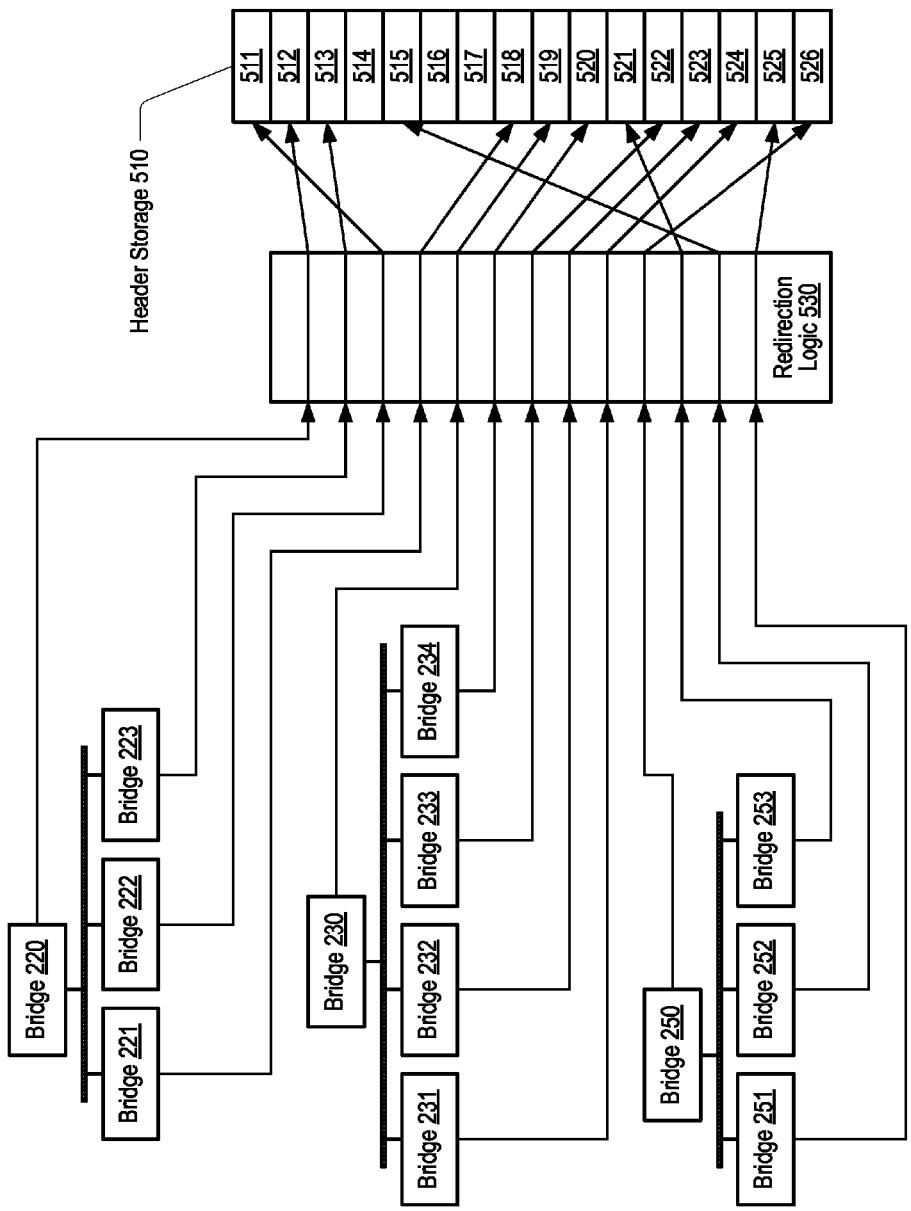
FIG. 5 is a block diagram of one embodiment of a mapping of virtual bridges to virtual bridge headers.

FIG. 5 is a block diagram of one embodiment of a mapping of virtual bridges to virtual bridge headers. In a computer system, virtualization hardware may include a number of virtual bridges 220-223, 230-234, and 250-253, header storage 510, and redirection logic 530. Header storage 510 may further include storage for a pool of virtual bridge headers 511-526. In one embodiment, the size of the header pool may be fixed and determined by the implementation of the virtualization hardware. Assignment of virtual bridge headers to a set of configured virtual bridges may correspond to the configuration indicated in a virtual switch bridge table such as table 430 of FIG. 4. In the illustrated embodiment, bridge 220 is mapped to header 512, bridge 221 is mapped to header 518, bridge 222 is mapped to header 511, etc. The number of configured virtual bridges may be less than the number of headers available in header storage 510, as shown. Further, virtual bridges may be assigned to headers in any order desired. In one embodiment, header assignments may be dynamically reprogrammed whenever a new configuration of virtual switches is desired. The maximum number of configured virtual bridges may be equal to the number of headers available in header storage 510.

During operation, when a virtual switch receives a data packet for routing, error handling, etc. the port logic of the virtual switch may use an assigned virtual bridge header to process the packet. Redirection logic 530 may be inserted between the port logic of the virtual switch and the bridge header storage 510 to redirect requests for information from the bridge header to the appropriate region of header storage 510 where the assigned header may be found.

Figure 6:
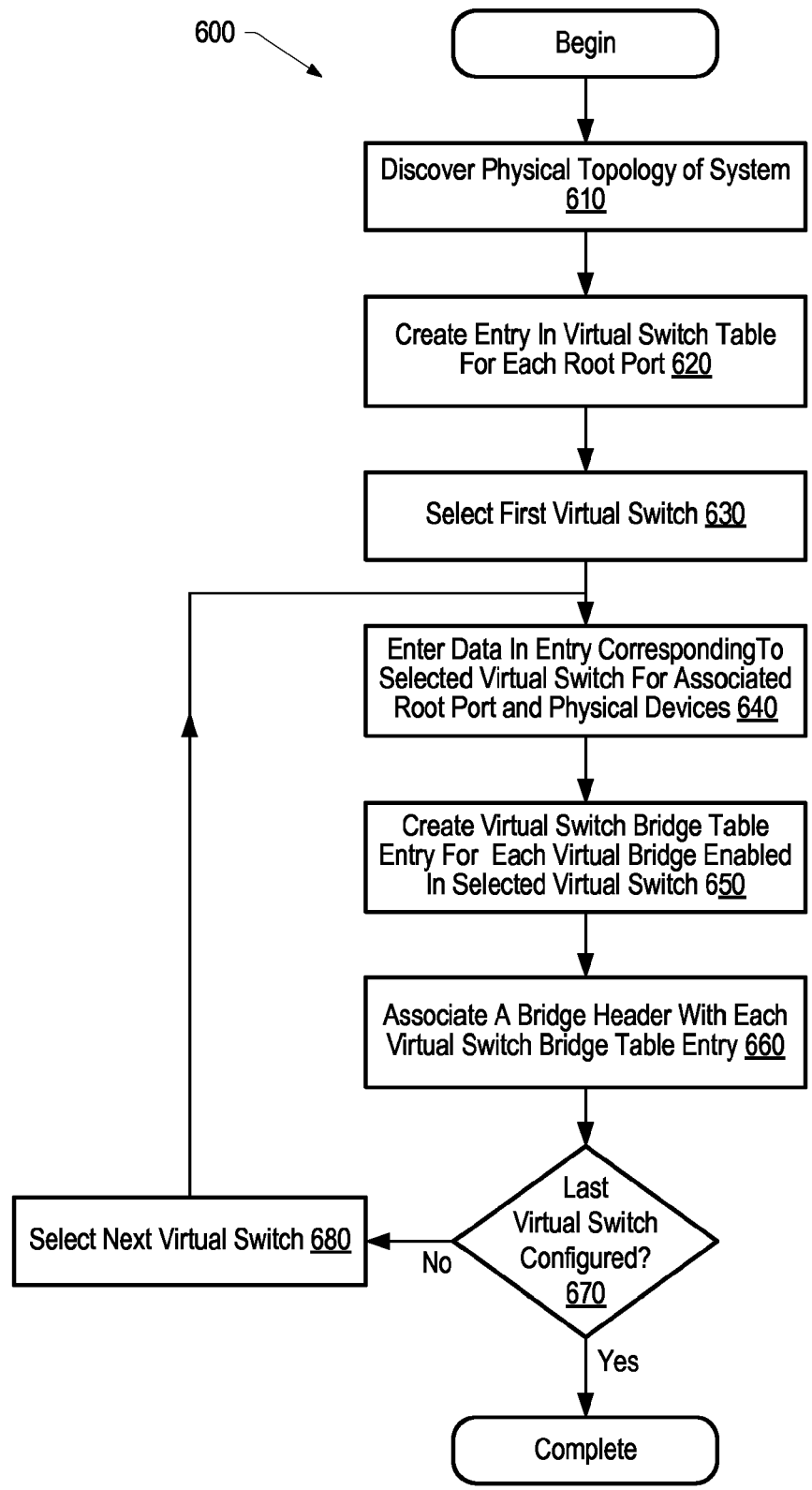
FIG. 6 illustrates one embodiment of a process that may be used to configure a computer system that includes virtualization hardware.

FIG. 6 illustrates one embodiment of a process 600 that may be used to configure a computer system that includes virtualization hardware. Process 600 begins with discovery of the physical topology of a computer system (block 610). For example, in a computer system comprising compute nodes coupled to I/O devices through a fabric of PCI Express switches, conventional PCI Express discovery may be performed to capture the topology of the system. Each compute node may include one or more root ports. Once the topology has been discovered, an entry may be created in a virtual switch table for each root port in the topology (block 620). A first virtual switch may then be selected (block 630). For the selected virtual switch, data may be entered in the corresponding virtual switch table entry for the associated root port and each associated physical device (block 640). Next, a virtual switch bridge table entry may be created for each virtual bridge enabled in the selected virtual switch (block 650). Data in the virtual switch table entry may indicate the location of corresponding data in the virtual switch bridge table. For each virtual switch bridge table entry, a bridge header may be associated with the corresponding virtual bridge (block 660). Once data has been entered into the virtual switch table and the virtual switch bridge table for the selected virtual switch, if the selected switch is not the last virtual switch to be configured (decision block 670), another virtual switch may be selected (block 680) and the process continued at block 640. If the selected switch is the last virtual switch to be configured (decision block 670), process 600 is complete.

Figure 7:
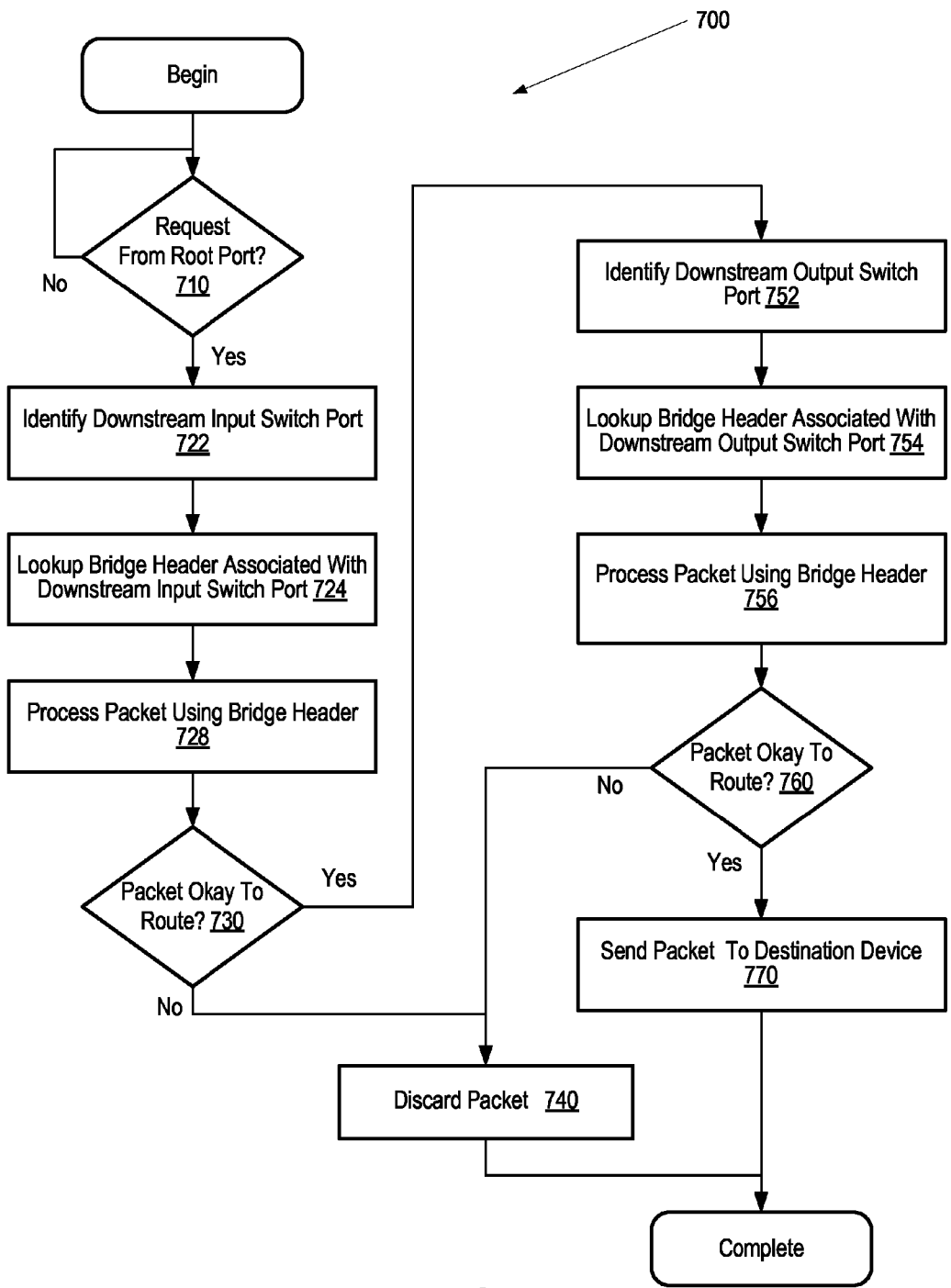
FIG. 7 illustrates one embodiment of a process for transferring packets downstream from a root port to one of a number of shared physical devices through a virtual switch.

FIG. 7 illustrates one embodiment of a process 700 for transferring packets downstream from a root port to one of a number of shared physical devices through a virtual switch. Process 700 begins with a virtual switch waiting to receive a request from a root port (decision block 710). For example, a request may be a transmission of a data packet to be routed to a physical device. If a request is received, the switch identifies the downstream input switch port that is associated with the root port from which the request was received (block 722). Next, a table lookup may be performed to identify a bridge header associated with the downstream input switch port (block 724). Using the identified bridge header, the data packet may be processed (block 726). If packet processing indicates that the packet does not meet one or more routing criteria (decision block 730), the packet may be discarded (block 740). Otherwise, the switch identifies the downstream output switch port that is associated with a destination device identified in the data packet (block 752). Next, a table lookup may be performed to identify a bridge header associated with the downstream output switch port (block 754). Using the identified bridge header, the data packet may be processed (block 756). If packet processing indicates that the packet does not meet one or more routing criteria (decision block 760), the packet may be discarded (block 740). Otherwise, the packet may be sent to the destination device (block 770) and process 700 is complete.

Figure 8:
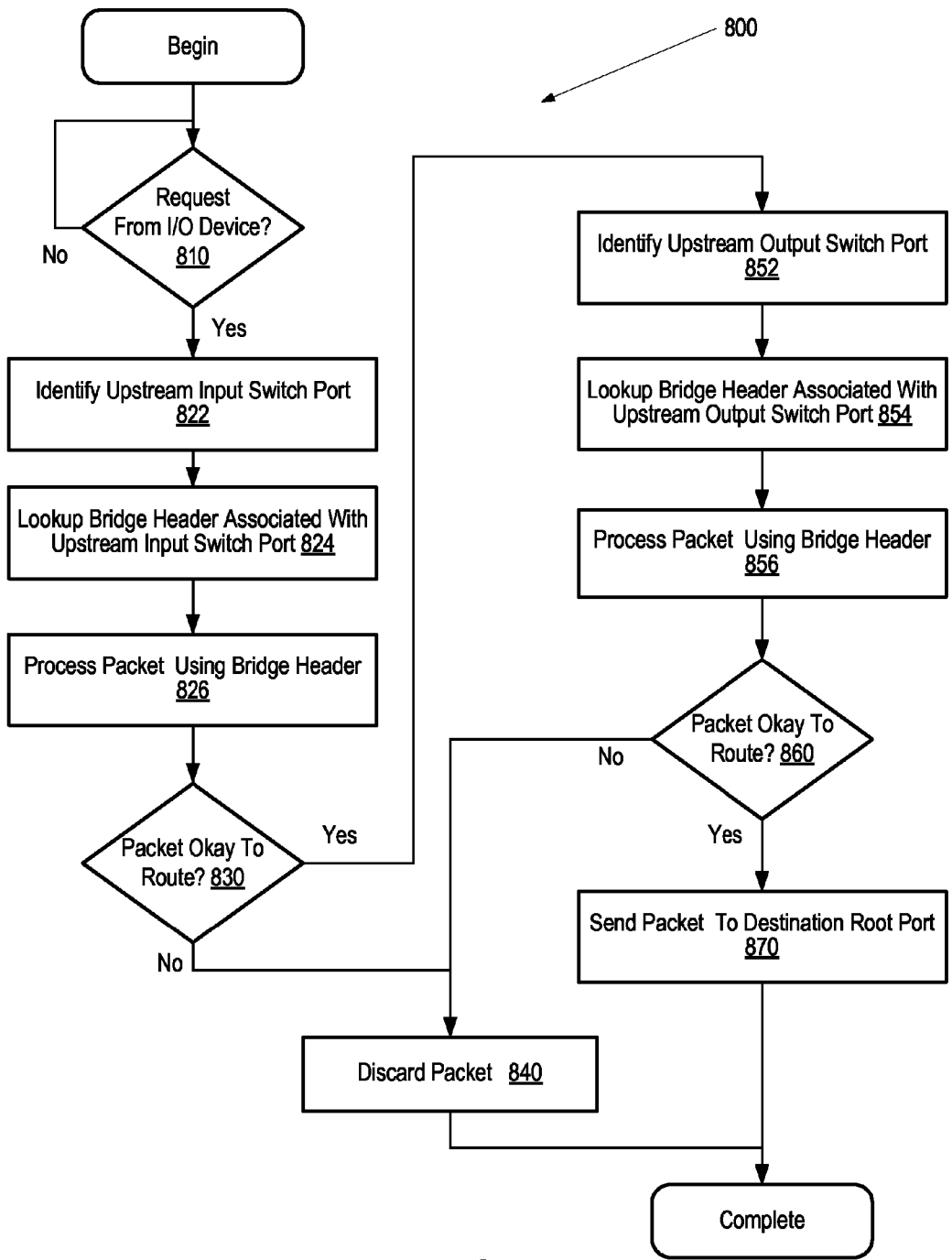
FIG. 8 illustrates one embodiment of a process for transferring packets upstream from one of a number of shared physical devices to a root port through a virtual switch.

FIG. 8 illustrates one embodiment of a process 800 for transferring packets upstream from one of a number of shared physical devices to a root port through a virtual switch. Process 800 begins with a virtual switch waiting to receive a request from an I/O device (decision block 810). For example, a request may be a transmission of a data packet to be routed to a root port. If a request is received, the switch identifies the upstream input switch port that is associated with the physical I/O device from which the request was received (block 822). Next, a table lookup may be performed to identify a bridge header associated with the upstream input switch port (block 824). Using the identified bridge header, the data packet may be processed (block 826). If packet processing indicates that the packet does not meet one or more routing criteria (decision block 830), the packet may be discarded (block 840). Otherwise, the switch identifies the upstream output switch port that is associated with a root port identified in the data packet (block 852). Next, a table lookup may be performed to identify a bridge header associated with the upstream output switch port (block 854). Using the identified bridge header, the data packet may be processed (block 856). If packet processing indicates that the packet does not meet one or more routing criteria (decision block 860), the packet may be discarded (block 840). Otherwise, the packet may be sent to the destination root port (block 870) and process 800 is complete.

It is noted that the above-described embodiments may comprise software. In such an embodiment, the program instructions that implement the methods and/or mechanisms may be conveyed or stored on a computer accessible medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Still other forms of media configured to convey program instructions for access by a computing device include terrestrial and non-terrestrial communication links such as network, wireless, and satellite links on which electrical, electromagnetic, optical, or digital signals may be conveyed. Thus, various embodiments may further include receiving, sending or storing instructions and/or data implemented in accordance with the foregoing description upon a computer accessible medium.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer system comprising:
    a switch operable to couple a root port to a plurality of shared or non-shared I/O devices;
    the switch providing a plurality of virtual bridges and enabling an administrator to configure the virtual bridges;
    the switch including a physical header storage section operable to store a plurality of bridge headers;
    the switch including programmable redirection logic operable to map each virtual bridge to a selectable region of the header storage section; and
    the redirection logic being operable to reassign virtual bridges to other regions of the header storage section in response to a new configuration;
    wherein the switch is configured to:
        receive a packet including data which identifies a root port and an I/O device; and
        route the packet in response to comparing the data in the packet to data in a bridge header mapped to the virtual bridge.

2. The system of claim 1, wherein the switch is programmable to be configured to provide a plurality of virtual switches for a plurality of root ports, each virtual switch coupling a root port to one or more I/O devices, wherein each virtual switch comprises a plurality of virtual bridges configurable by an administrator.

3. The system of claim 2, wherein in response to receiving a packet, the switch is further configured to:
    identify a particular root port from a plurality of root ports connected to the switch to which to route the packet;
    compare the data in the packet to data in the bridge headers mapped to the virtual bridges of the virtual switch coupled to the particular root port;
    route the packet through the virtual switched coupled to the particular root port.

4. The system of claim 1, wherein the switch enables an administrator to configure at least some of the virtual bridges into a hierarchy of virtual bridges in which a first virtual bridge connects a root port to the remaining virtual bridges of the hierarchy.

5. The system of claim 4, wherein in response to receiving a packet, the switch is further configured to:
    identify a first bridge header mapped to a first virtual bridge coupled to a root port;
    identify a second bridge header mapped to a second virtual bridge coupled to an I/O device; and
    route the packet in response to comparing the data in the packet to data in the first and second bridge headers mapped to the first and second virtual bridges.

6. A switch for transferring packets, the switch being characterized in that:
    the switch is operable to couple a root port to a plurality of shared or non-shared I/O devices;
    the switch is configurable to provide a plurality of virtual bridges;
    the switch is configured to enable an administrator to configure the virtual bridges;
    the switch comprises a physical header storage section operable to store a plurality of bridge headers;
    the switch comprises programmable redirection logic operable to map each virtual bridge to a selectable region of the header storage section, the redirection logic being operable to reassign virtual bridges to other regions of the header storage section in response to a new configuration; and the switch is configured to:
receive a packet including data which identifies a root port and an I/O device; and
route the packet in response to comparing the data in the packet to data in a bridge header mapped to the virtual bridge.

7. The switch of claim 6, wherein the switch is programmable to be configured to provide a plurality of virtual switches for a plurality of root ports, each virtual switch coupling a root port to one or more I/O devices, wherein each virtual switch comprises a plurality of virtual bridges configurable by an administrator.

8. The switch of claim 7, wherein in response to receiving a packet, the switch is further configured to:
identify a particular root port from a plurality of root ports connected to the switch to which to route the packet;
compare the data in the packet to data in the bridge headers mapped to the virtual bridges of the virtual switch coupled to the particular root port;
route the packet through the virtual switched coupled to the particular root port.

9. The switch of claim 6, wherein the switch enables an administrator to configure at least some of the virtual bridges into a hierarchy of virtual bridges in which a first virtual bridge connects a root port to the remaining virtual bridges of the hierarchy.

10. The system of claim 9, wherein in response to receiving a packet, the switch is further configured to:
identify a first bridge header mapped to a first virtual bridge coupled to a root port;
identify a second bridge header mapped to a second virtual bridge coupled to an I/O device; and
route the packet in response to comparing the data in the packet to data in the first and second bridge headers mapped to the first and second virtual bridges.

11. A method for transferring packets comprising:
providing a switch to couple a root port to a plurality of shared or non-shared I/O devices;
providing a plurality of virtual bridges within the switch;
enabling an administrator to configure the virtual bridges within the switch;
providing a physical header storage section within the switch operable to store a plurality of bridge headers;
providing programmable redirection logic within the switch operable to map each virtual bridge to a selectable region of the header storage section, the redirection logic being operable to reassign virtual bridges to other regions of the header storage section in response to a new configuration; and
configuring the switch to:
receive a packet including data which identifies a root port and an I/O device; and
route the packet in response to comparing the data in the packet to data in a bridge header mapped to the virtual bridge.

12. The method of claim 11, further comprising programming the switch to provide a plurality of virtual switches for a plurality of root ports, each virtual switch coupling a root port to one or more I/O devices, wherein each virtual switch comprises a plurality of virtual bridges configurable by an administrator.

13. The method of claim 12, further comprising configuring the switch to respond to receiving a packet by:
identifying a particular root port from a plurality of root ports connected to the switch to which to route the packet;
comparing the data in the packet to data in the bridge headers mapped to the virtual bridges of the virtual switch coupled to the particular root port;
routing the packet through the virtual switched coupled to the particular root port.

14. The method of claim 11, further comprising enabling an administrator to configure at least some of the virtual bridges into a hierarchy of virtual bridges in which a first virtual bridge connects a root port to the remaining virtual bridges of the hierarchy.

15. The system of claim 14, further comprising configuring the switch to respond to receiving a packet by:
identifying a first bridge header mapped to a first virtual bridge coupled to a root port;
identifying a second bridge header mapped to a second virtual bridge coupled to an I/O device; and
routing the packet in response to comparing the data in the packet to data in the first and second bridge headers mapped to the first and second virtual bridges.

* * * * *